US012812342B2

(12) United States Patent
Gao

(10) Patent No.: US 12,812,342 B2
(45) Date of Patent: Nov. 24, 2026

(54) NETWORK CONNECTIVITY DETERMINATION FOR VEHICLE APPLICATIONS

(71) Applicant: Atieva, Inc., Newark, CA (US)

(72) Inventor: Xu Gao, San Jose, CA (US)

(73) Assignee: Atieva, Inc., Newark, CA (US)

( * ) Notice: Subject to any disclaimer, the term of this patent is extended or adjusted under 35 U.S.C. 154(b) by 212 days.

(21) Appl. No.: 18/704,845

(22) PCT Filed: Oct. 18, 2022

(86) PCT No.: PCT/US2022/078265
§ 371 (c)(1),
(2) Date: Apr. 25, 2024

(87) PCT Pub. No.: WO2023/076816
PCT Pub. Date: May 4, 2023

(65) Prior Publication Data

US 2025/0260958 A1 Aug. 14, 2025

Related U.S. Application Data

(60) Provisional application No. 63/263,069, filed on Oct. 26, 2021.

(51) Int. Cl.
*H04W 4/44* (2018.01)
*H04L 12/46* (2006.01)

(52) U.S. Cl.
CPC ........... *H04W 4/44* (2018.02); *H04L 12/4641* (2013.01)

(58) Field of Classification Search
CPC ........ H04W 4/44; H04L 12/4641; H04L 67/12
See application file for complete search history.

(56) References Cited

U.S. PATENT DOCUMENTS 8,570,993 B2 10/2013 Austin et al.
2012/0140688 A1 6/2012 Hering et al.
(Continued)

FOREIGN PATENT DOCUMENTS

EP 1158718 A2 11/2001
WO 2018125686 A2 7/2018

OTHER PUBLICATIONS

Extended European Search Report for European Application No. 22888383.1, mailed Jul. 29, 2025, 11 pages.
(Continued)

*Primary Examiner* — Eric Myers
(74) *Attorney, Agent, or Firm* — Brake Hughes Bellermann LLP

(57) ABSTRACT

At a vehicle subsystem of a vehicle, a connectivity signal may be received over a vehicle network indicating a connectivity status of the vehicle to at least one external network. It may be determined, from the connectivity signal, whether the connectivity status is insufficient or sufficient for a network-dependent operation of the vehicle subsystem using the at least one external network. When the connectivity signal indicates that the connectivity status is insufficient for the network-dependent operation of the vehicle subsystem, a vehicle virtual local area network (VVLAN) provided to the vehicle subsystem using the vehicle network may be deactivated. When the connectivity signal indicates that the connectivity status that the connectivity status is sufficient for the network-dependent operation of the vehicle subsystem, the VVLAN may be activated.

20 Claims, 6 Drawing Sheets

(56) References Cited

U.S. PATENT DOCUMENTS

| | | | |
|---|---|---|---|
| 2015/0341862 A1 | 11/2015 | Lei et al. | |
| 2021/0120595 A1 | 4/2021 | Singh et al. | |
| 2021/0160774 A1 | 5/2021 | Nagar et al. | |
| 2024/0039932 A1* | 2/2024 | Torisaki | H04L 63/102 |

OTHER PUBLICATIONS

International Search Report and Written Opinion for PCT Application No. PCT/US2022/078265, mailed on Dec. 28, 2022, 9 pages.

* cited by examiner

NETWORK CONNECTIVITY DETERMINATION FOR VEHICLE APPLICATIONS

CROSS-REFERENCE TO RELATED APPLICATION

This application is a 35 U.S.C. § 371 National Phase Entry Application from PCT Application No. PCT/US2022/078265, filed on Oct. 18, 2022, entitled "NETWORK CONNECTIVITY DETERMINATION FOR VEHICLE APPLICATIONS", and designating the U.S., which claims priority to U.S. Provisional Patent Application No. 63/263,069, filed on Oct. 26, 2021, and entitled "NETWORK CONNECTIVITY DETERMINATION FOR VEHICLE APPLICATIONS," the disclosure of which are incorporated by reference herein in their entireties.

TECHNICAL FIELD

This description relates to vehicle network connectivity.

BACKGROUND

Automobiles and other vehicles may be equipped with various computational resources. Such computational resources may be used to enhance vehicle operation and control, as well as to provide information, entertainment, and convenience for vehicle users.

In many cases, implementation and use of such computational resources may benefit from network connectivity. For example, a vehicle infotainment system may be configured to run applications desired by a user of the vehicle, and such applications may utilize information obtained via the Internet.

In these and similar contexts, access to, and use of, the Internet or other networks may be complicated by a mobile nature of a vehicle. Techniques for enabling a mobile device to monitor and use available networks while in motion have been developed in the context of smartphones, tablets, and other mobile devices. However, differences in vehicle structures as compared to such mobile devices make it difficult, inefficient, or impractical to adopt such techniques in the vehicle context.

SUMMARY

A computer program product may be tangibly embodied on a non-transitory computer-readable storage medium and may comprise instructions that, when executed by at least one computing device, are configured to cause the at least one computing device to receive, at a vehicle subsystem of a vehicle, a connectivity signal over a vehicle network indicating a connectivity status of the vehicle to at least one external network. The instructions, when executed by the at least one computing device, may be configured to cause the at least one computing device to determine, from the connectivity signal, whether the connectivity status is insufficient or sufficient for a network-dependent operation of the vehicle subsystem using the at least one external network. The instructions, when executed by the at least one computing device, may be configured to cause the at least one computing device to deactivate a vehicle virtual local area network (VVLAN) provided to the vehicle subsystem using the vehicle network when the connectivity signal indicates that the connectivity status is insufficient for the network-dependent operation of the vehicle subsystem. The instructions, when executed by the at least one computing device, may be configured to cause the at least one computing device to activate the VVLAN when the connectivity signal indicates that the connectivity status that the connectivity status is sufficient for the network-dependent operation of the vehicle subsystem.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
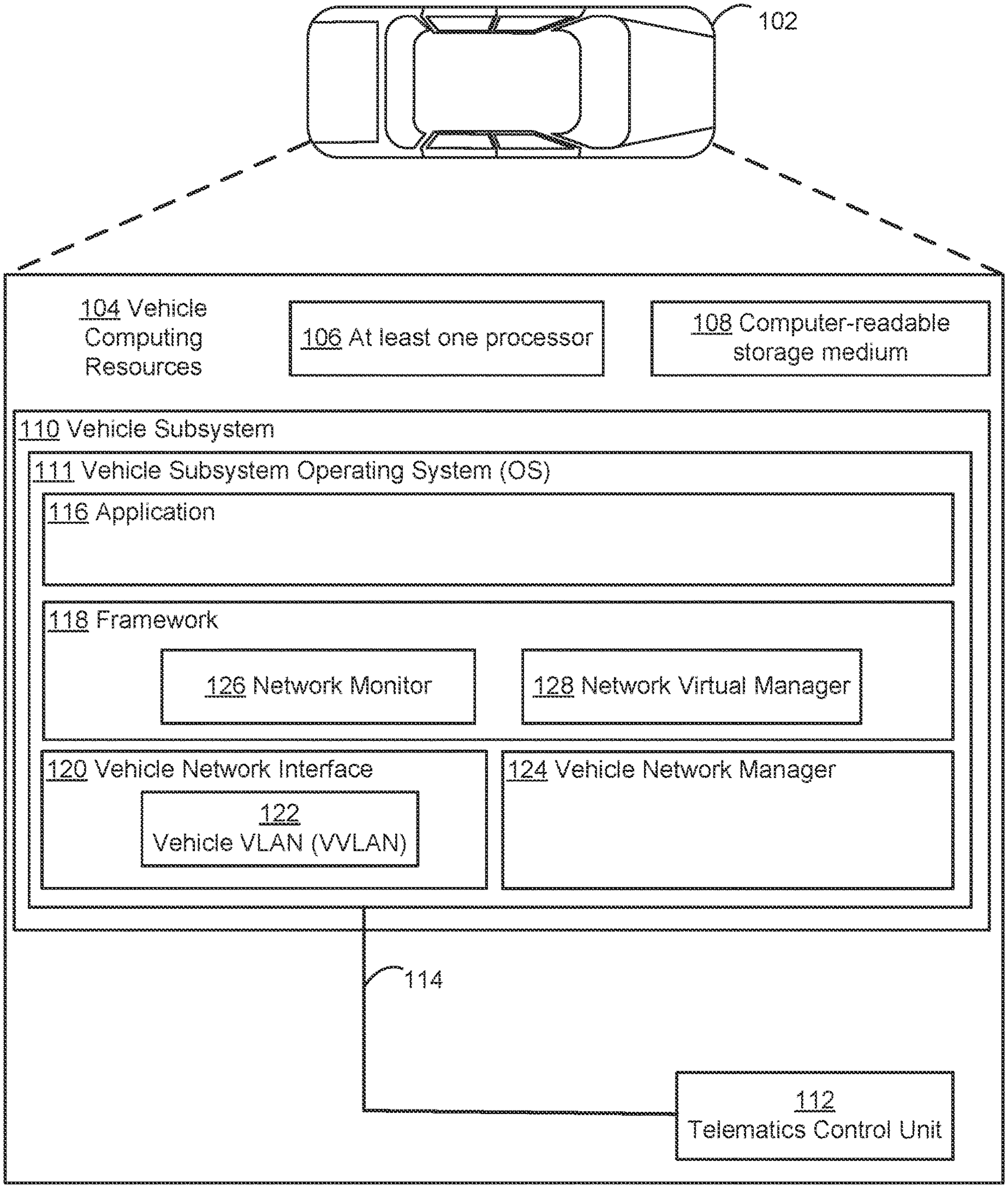
FIG. 1 is a block diagram of a system for vehicle connectivity determination for applications.

Described systems and techniques enable notification of vehicle network connectivity status, and related information, to applications being executed using vehicle computational resources. Accordingly, the applications may optimize execution of various application functions based on current network conditions, and users may enjoy best-available use of such application functions. Moreover, providers of the vehicle and/or the applications may be provided with an ability to design and implement the applications and related functionalities in an efficient manner.

Vehicles typically interface with one or more available networks at a vehicle network gateway, such as a Telematics Control Unit (TCU). For example, a TCU of a vehicle may provide a single site at which on-board modems and related hardware (e.g., chipset(s)) connect and interface with, e.g., a cellular network (e.g., a 4G, Long Term Evolution (LTE), or 5G network), a WiFi network(s), a GPS network, or other networks. Thus, network data may be obtained from, or provided to, the Internet or other networks via the TCU, using any currently-available network(s).

Additionally, one or more vehicle networks may be provided for intra-vehicle communications. For example, various vehicle subsystems may be configured to communicate with one another, as well as to communicate with the TCU to obtain and utilize network access. For example, various applications provided using a vehicle infotainment system may require network access to implement their intended functionalities. In other examples, a vehicle network may be used to communicate with a network-equipped mobile device of a user of the vehicle.

Conventional mobile devices, such as smartphones and tablets, come equipped with two or more internal modems, and related hardware and software, to enable applications of the mobile devices to execute in a desired manner. For example, a smartphone may provide an application for streaming video or other media, and may include internal hardware and software to detect and monitor availability of external networks over which the media may be streamed. Then, such smartphones may, for example, determine whether it is more cost-effective to use a cellular or WiFi network (and corresponding physical modem), or may pause streaming operations when no network is available.

In a vehicle context, however, separation of the TCU from other network-ready resources of the vehicle makes it difficult and inefficient to provide network monitoring and use throughout the vehicle. For example, a particular car subsystem, such as the infotainment system, may utilize an existing framework (including, e.g., a particular operating system (OS) and related connectivity features) to design and implement desired applications. Such a framework may not be designed for obtaining network connectivity information from the TCU. For example, such a framework may be designed for the context of conventional mobile devices, which, as described above, rely on interactions with native, internal hardware modems for network connectivity determinations.

It is possible to implement virtual or simulated versions of such internal hardware, which may then be used in a generally conventional manner with respect to network connectivity determinations. However, such solutions are resource-intensive and limited in scope. For example, different vendors and other designers may be required to design and implement such solutions individually, e.g., on a vendor-specific and/or framework-specific basis.

In contrast, techniques described herein provide a universal, easily-implemented way to provide detailed, timely network connectivity updates across different vendors (e.g., across different vendor solutions), frameworks, and applications, using existing vehicle network resources. Moreover, only minimal changes to the existing vehicle network resources are needed to obtain these and other benefits.

For example, described techniques may utilize a vehicle virtual local area network (VVLAN), built on a physical LAN connected to the TCU, to provide network connectivity status updates to an existing framework used to provide one or more car subsystems. Then, the existing framework may provide the network connectivity status updates to one or more applications being executed using the framework.

As described in detail below, the physical LAN may represent, e.g., a hardwired connection(s) between the TCU and many different subsystems of the vehicle. One or more virtual LANs may be built using the physical LAN, as needed for each/any vehicle subsystems. In the various example implementations, the referenced VVLAN is a specific VLAN designed and implemented to connect the subsystem (e.g., infotainment subsystem) requiring network connectivity status updates to the TCU.

Then, rather than maintaining the VVLAN at all times while the vehicle is operational, the described techniques dynamically activate and deactivate the VVLAN to indicate corresponding network connectivity. That is, the described techniques may deactivate the VVLAN when network connectivity is unavailable, and may activate (and configured) the VVLAN when network connectivity is available.

Therefore, when the VVLAN is deactivated, the car subsystem (e.g., framework) may be immediately notified that network connectivity is lost, and may take appropriate action. When the VVLAN is activated and configured, the car subsystem may be notified that network connectivity has been established or is available. Moreover, in the latter scenarios, the VVLAN may be used to provide additional updates regarding network details such as, e.g., network signal strength, type of connected network, and/or Internet reachability.

FIG. 1 is a block diagram of a system for vehicle connectivity determination for applications. In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

As illustrated, the vehicle 102 may include various types of vehicle computing resources 104, which may include many different types and configurations of hardware and software resources. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., solid state drives (SSDs), random access memories (RAMs), or flash memories.

In many examples, multiple pairs or groups of processors and memories may be distributed in desired locations within the vehicle 102, together with other related hardware. For example, multiple control boards may be assembled and positioned appropriately within the vehicle 102 to perform desired functions. Such control boards and related hardware and software may be referred to as electronic control units (ECUs).

For example, one or more ECUs may be used to support and enable corresponding vehicle subsystems, represented in the simplified example of FIG. 1 as vehicle subsystem 110. Examples of current vehicle subsystems may include subsystems for navigation (including an advanced driver assistance system (ADAS) for autonomous or semi-autonomous systems, which may include one or more Autonomous Control Units (ACUs)), vehicle safety features, climate control, and information/entertainment (infotainment) systems.

In many implementations, the vehicle 102 may include multiple sensors, which may be used to detect information regarding an environment or surroundings of the vehicle 102. For example, such information may be used to implement the type of ADAS navigation referenced above, or to provide various other types of control of, or reaction by, the vehicle 102. For example, such sensors may include video cameras, Light Detection and Ranging (lidar) sensors, radar sensors, ultrasonic sensors, GPS sensors, and various other types of sensors.

As further illustrated, the vehicle subsystem 110 may include a vehicle subsystem operating system (OS) 111, which may be partially or completely specific to (designed by) a provider (e.g., manufacturer) of the vehicle 102, or of the vehicle subsystem 110. For example, the vehicle subsystem OS 111 may be implemented as a Linux OS.

Another example of an ECU is illustrated in FIG. 1 as telematics control unit (TCU) 112. As referenced above, the TCU 112 may represent a single site of network connectivity for connecting the vehicle 102 to external networks. Maintaining the TCU 112 as a single site of network connectivity may provide efficiency by reducing or eliminating a need to reproduce connectivity components (e.g., hardware modems) at multiple locations, or for multiple vehicle subsystems, within the vehicle 102. Moreover, maintaining a single site of network connectivity may assist in protecting the vehicle 102 from various types of cyberattacks. For example, the TCU 112 may be equipped with firewalls and various other protection mechanisms used to prevent attackers from, e.g., controlling operations or the vehicle 102, or accessing confidential information within the vehicle 102.

In FIG. 1, the TCU 112 is connected by a vehicle network 114 to the vehicle subsystem 110. More generally, the vehicle network 114 may represent, e.g., wiring and related hardware/software to provide one or more busses and related protocols for distributing data within the vehicle 102. As such, the vehicle network 114 provides opportunities for intra-vehicle communication between and among the various vehicle subsystems, including communications between the TCU 112 and each vehicle subsystem that requires external network connectivity, including the vehicle subsystem 110.

For example, the vehicle network 114 may utilize existing types of vehicle bus topologies and related busses, including, e.g., the Controller Area Network (CAN) bus, the Local Interconnect Network (LIN) bus, or the Media Oriented Systems Transport (MOST). The network 114 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

As referenced above, and illustrated and described in more detail below, e.g., with respect to FIGS. 3 and 5, the TCU 112 may include multiple modems and/or related hardware for connecting to two or more external networks. For example, the TCU 112 may provide external connectivity to WiFi networks, long term evolution (LTE) networks, or 3G/4G/5G networks.

Within the vehicle subsystem 110, one or more applications, represented by an application 116, may require or benefit from access to such external networks via the TCU 112. For example, in detailed examples provided below with respect to FIGS. 3-6, the vehicle subsystem 110 may represent a vehicle infotainment system, and the application 116 may represent any application running on the vehicle infotainment system, including third party applications provided by external vendors or suppliers.

To support operations of many such applications, a framework 118 may be used, for example, to connect the applications to other hardware or software within the vehicle subsystem 110, or more generally within the vehicle 102. For example, the framework may include or represent an operating system (OS), such as the Android OS, or variations thereof.

One of the functions of the framework 118 is to provide network connectivity to the application 116. For example, in addition to connecting the application 116 to external networks through the TCU 112, the framework 118 may connect the application 116 to other vehicle subsystems using the vehicle network 114.

In other examples, the framework 118 may connect the application 116 to a separate device having network capabilities, such as a smartphone of a driver of the vehicle 102. In such cases, the framework 118 may include a hardware and/or virtual modem for establishing such connections.

To provide network access to, and interaction with, the vehicle network 114, the vehicle subsystem 110 may include, or access, a vehicle network interface 120, e.g., implemented using the vehicle subsystem OS 111. For example, the vehicle network interface 120 may include a physical port (and associated software, e.g., network driver(s)) to establish a wired connection to the vehicle network 114, such as when the vehicle network 114 represents or includes an automotive Ethernet network.

In more specific examples, the vehicle network interface 120 may include or support a vehicle virtual local area network (VVLAN). In such cases, the vehicle network interface 120 may be implemented as a service running in the vehicle subsystem 110, e.g., using a socket in the kernel of the vehicle subsystem OS 111.

Providing one or more VLANs using an underlying physical network provides a number of advantages. For example, a VLAN may be added to provide additional layers of security and configurability with respect to the underlying physical network. A VLAN may provide additional network efficiency and performance, and simplify device management of devices included in the physical network.

In addition to these and other advantages of VLAN implementation, in example implementations described herein, the VVLAN may be used as a proxy for network connectivity, so that the framework 118, and thus the application 116, may be notified of network connectivity information without requiring separate physical or virtual modems to be implemented using the vehicle subsystem OS 111 and/or the framework 118.

For example, a vehicle network manager 124 may be configured to provide network connectivity information to the framework 118, and to the application 116, by implementing the VVLAN 122 as a dynamic VLAN that is activated and deactivated in response to network connectivity conditions determined at the TCU 112 and communicated via the vehicle network 114. In other words, the vehicle network manager 124 may be configured to deactivate (e.g., deconstruct, tear down, or turn off) the VVLAN 122 when the TCU notifies the vehicle network manager 124 that no external network connectivity is available, and may be further configured to activate (e.g., construct, configure, deploy, or turn on) the VVLAN 122 when the TCU notifies the vehicle network manager 124 that external network connectivity is currently available.

A network monitor 126 of the framework 118 may be configured to detect a current status and availability of the dynamic VVLAN 122. Based on operations of the network monitor 126, the framework 118 may be configured to notify the application 116 of the current connectivity status of the TCU 112.

In addition, a network virtual manager 128 may represent one or more network-specific virtual managers that may be configured to receive additional state or status information regarding corresponding types of network access. For example, the network virtual manager 128 may be specific to WiFi network access, or LTE or other types of cellular network access.

Then, when a particular type of network (e.g., WiFi, cellular) is available at the TCU 112 and the VVLAN is rendered operational by the vehicle network manager 124, the vehicle network manager 124 may be further configured to provide the additional state information regarding the corresponding, available network. For example, the vehicle network manage 124 may notify the network virtual manager 128 of a current signal strength of the available network, information characterizing the type of available network, and/or information characterizing a reachability of the Internet via the available network. In this way, the network virtual manager 128 may provide such information to the application 116.

Accordingly, in FIG. 1, the application 116 may be provided with an ability to take any appropriate action in response to available network conditions. For example, when streaming video or other information, the application 116 may pause, stop, or restart streaming operations based on the current network conditions. In other examples, when multiple networks are available, the application 116 may make pre-configured determinations to choose which network to use, based on cost, requirement bandwidth, size of files to be transferred, and various other factors.

These and other advantages may be obtained with minimal modifications to the vehicle subsystem OS 111, or to the framework 118. For example, the network virtual manager 128 may be constructed using only necessary portions and functions of corresponding types of modems, without a requirement to deploy and/or construct a full physical or virtual modem within the vehicle subsystem OS 111 and/or in the framework 118.

Moreover, these advantages are obtained without requiring knowledge or action on the part of application developers of the application 116. For example, application developers, including third party application developers, may use an existing software development kit (SDK) application program interface (API) provided by Android or other provider(s) of the framework 118, and obtain desired connectivity notifications and information, without being aware of operations of the vehicle network manager 124 with respect to the dynamic VVLAN 122.

Figure 2:
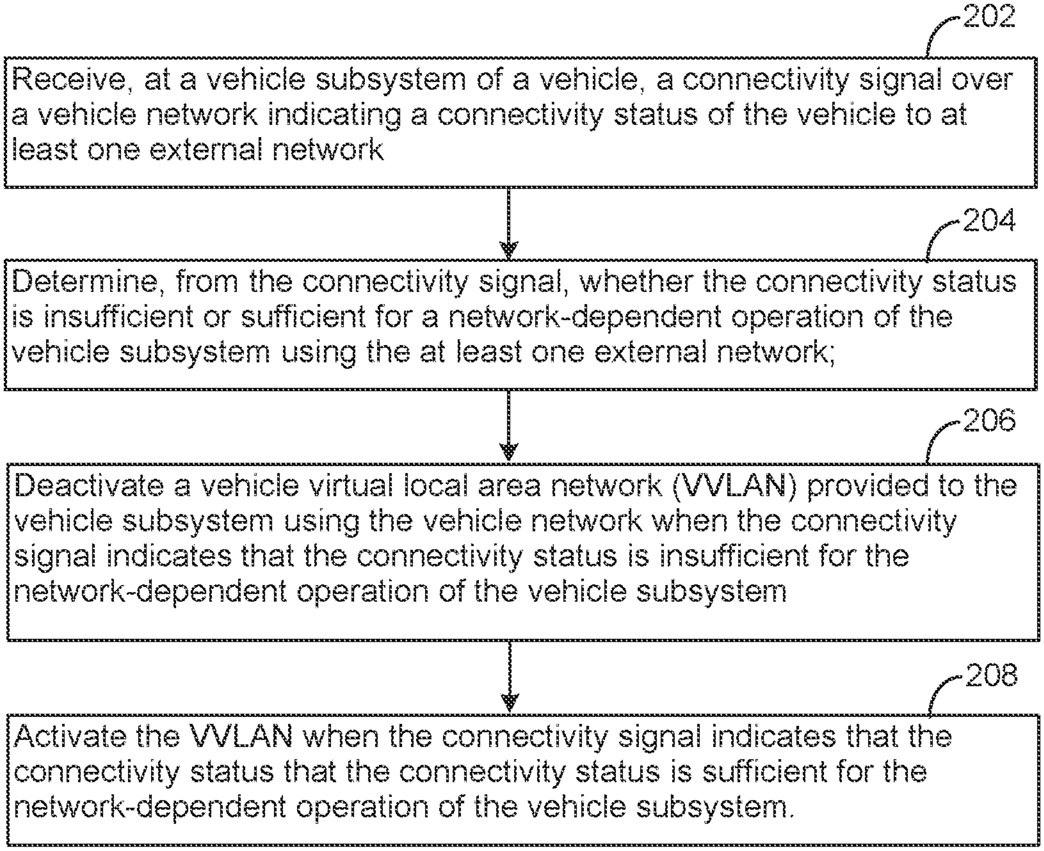
FIG. 2 is a flow chart illustrating more detailed examples of operations of the system of FIG. 1.

FIG. 2 is a flow chart illustrating more detailed examples of operations of the system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations.

In FIG. 2, a connectivity signal may be received at a vehicle subsystem of a vehicle, over a vehicle network of the vehicle, the connectivity signal indicating a connectivity status of the vehicle to at least one external network (202). For example, the vehicle network manager 124 may receive the connectivity signal from the TCU 112, over the vehicle network 114. The connectivity signal may indicate whether one or more of a WiFi or a cellular network is available (e.g., connected) at the TCU 112.

From the connectivity signal, it may be determined whether the connectivity status is insufficient or sufficient for a network-dependent operation of the vehicle subsystem using the at least one external network (204). For example, the vehicle network manager 124, executing using the vehicle subsystem OS 111, may analyze the connectivity signal to determine whether the connectivity status is insufficient or sufficient for a network-dependent operation of the vehicle subsystem 110, e.g., for an operation of the application 116 that relies on Internet access, such as downloading a file or uploading a file.

A vehicle virtual local area network (VVLAN) provided to the vehicle subsystem using the vehicle network may be deactivated when the connectivity signal indicates that the connectivity status is insufficient for the network-dependent operation of the vehicle subsystem (206). For example, the network monitor 126 may detect that the VVLAN 122 is deactivated, e.g., by the vehicle network manager 124. Accordingly, the network monitor 126 may cause the framework 118 to notify the application 116 that Internet-dependent operations should be paused or delayed.

The VVLAN may be activated when the connectivity signal indicates that the connectivity status that the connectivity status is sufficient for the network-dependent operation of the vehicle subsystem (208). For example, the vehicle network manager 124 may activate and configure the VVLAN when the connectivity signal via the vehicle network 114 indicates that at least one external network, e.g., a WiFi or cellular network, is available and connected.

In example implementations, the vehicle network manager 124 may be configured to take necessary steps to reconfigure and redeploy the VVLAN 122, so that the VVLAN 122 is fully equipped to continue network interactions with the TCU 112 and other vehicle subsystems. For example, the vehicle network manager 124 may be designed to configure a designated Internet Protocol (IP) routing table to use a designated virtual interface of the vehicle network interface 120 as a default interface, and add a Media Access Control (MAC) address of the virtual interface to a static Address Resolution Protocol (ARP) table to enable and maintain communications between, e.g., the vehicle subsystem 110 and the TCU 112. Additional example techniques for activating and deactivating the VVLAN 122 are provided below, with respect to FIGS. 3-6.

Figure 3:
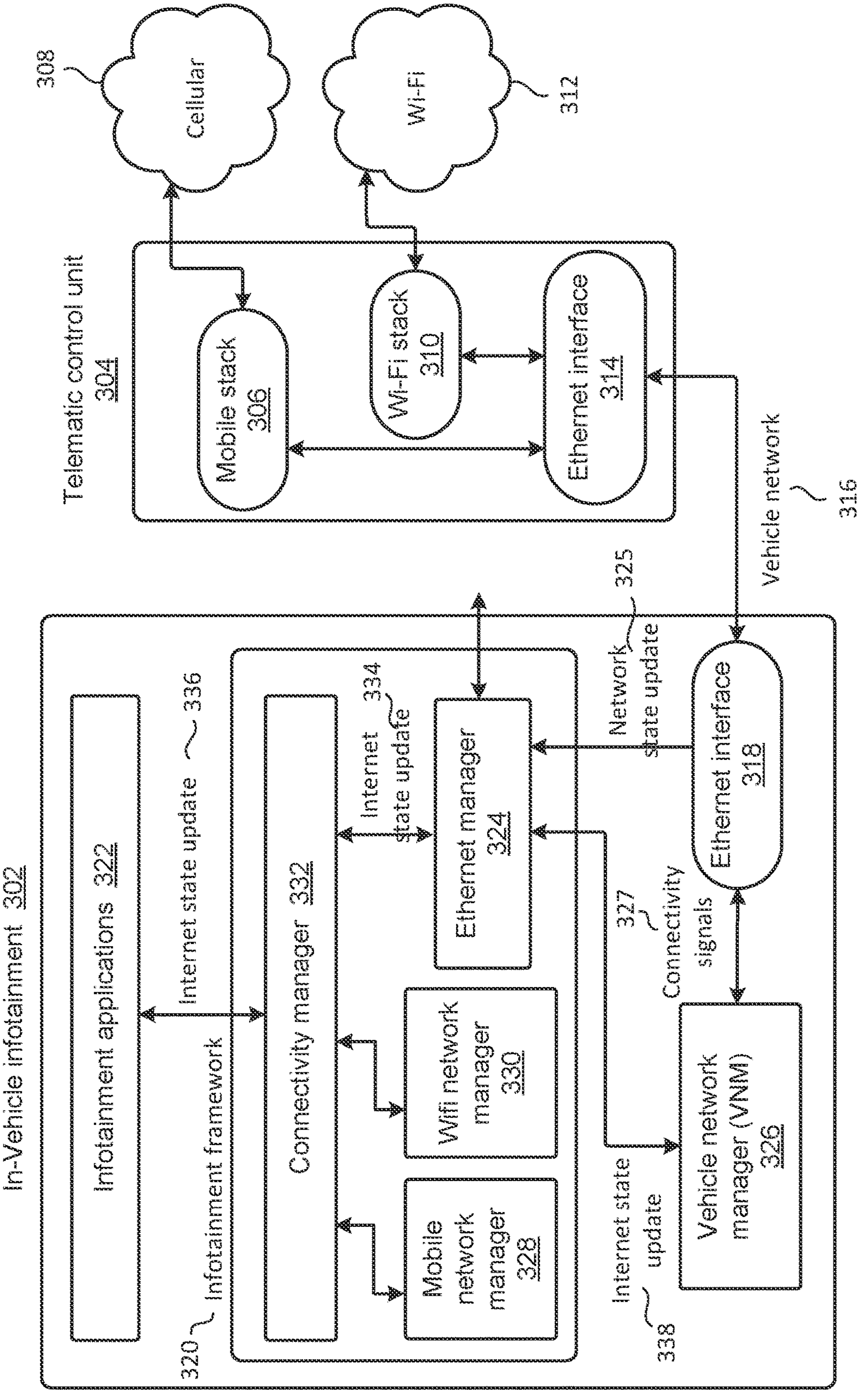
FIG. 3 is a block diagram illustrating a more detailed example of the system of FIG. 1.

FIG. 3 is a block diagram illustrating a more detailed example of the system of FIG. 1. In the example of FIG. 3, in-vehicle infotainment (IVI) system 302, or IVI 302, represents an example of the vehicle subsystem 110 of FIG. 1.

In modern vehicles, the IVI 302 may represent the primary user interface for a vehicle. For example, the IVI 302 may be mounted at a front console of the vehicle 102 of FIG. 1, accessible by a driver and front-seat passenger. Accordingly, the IVI 302 requires all necessary hardware and software to provide audiovisual outputs and receive user inputs, and to enable one or more types of network connections with other vehicle subsystems or other devices (e.g., a smartphone of a user).

Therefore, although not separately illustrated in the simplified example of FIG. 3, the IVI 302 may provide one or more touchscreens and related graphical user interfaces (GUIs), which a driver or other user may use, for example, to control functions of the vehicle such as climate control, to access navigation information, to access various types of multimedia entertainment, to enable voice control of these and other features, and for many other purposes. The IVI 302 thus has high demands in terms of providing a fast and convenient user experience.

As referenced and described above, many of the just-referenced features and functions of the IVI 302 may include, or require, network-dependent operations. For example, the IVI 302 may require network connection and access to provide desired functions. For example, the IVI 302 may require network access to download or upload a file(s).

Moreover, given the user-centric nature of the IVI 302, it is important for such network-dependent operations to be executed in a fast, seamless manner, to achieve an expected outcome as quickly as possible given network conditions, and with minimal input being required from a user. For example, if the IVI 302 is streaming video and a network connection is temporarily lost, then the IVI 302 of FIG. 3 provides the abilities of automatically pausing the video without input from the user being required, detect when network connectivity is available, and resume the video without input from the user being required. Consequently, a high level of user experience may be provided.

As also referenced above, a TCU 304 may be configured as a single point of external network access for a vehicle. In FIG. 3, the TCU 304 is illustrated as including a mobile stack 306 that represents hardware and associated software (e.g., a properly-configured modem chipset) for accessing a cellular network 308. The TCU 304 is illustrated as also including a WiFi stack 310 that represents hardware and associated software (e.g., a properly-configured modem chipset) for accessing a WiFi network 312. The TCU 304 further includes an Ethernet interface 314 providing a physical connection (e.g., port) and associated software for a wired connection of the TCU 304 to an Ethernet vehicle network 316 (represented by arrow in FIG. 3).

Similarly, the IVI 302 is illustrated as including an Ethernet interface 318, representing an example of the vehicle network interface 120 of FIG. 1. As with the Ethernet interface 314, the Ethernet interface 318 provides a physical connection (e.g., port) and associated software for a wired connection of the IVI 302 to the Ethernet vehicle network 316.

The IVI 302 further includes an infotainment framework 320, as an example of the framework 118 of FIG. 1, as well as multiple infotainment applications 322, as examples of the application 116 of FIG. 1. The infotainment framework 320 may be configured to include an Ethernet manager 324. As referenced above, and illustrated in more detail below with respect to FIGS. 4 and 5, the Ethernet manager 324 may be configured to communicate with the Ethernet interface 318 as part of a virtual vehicle local area network, corresponding to the VVLAN 122 of FIG. 1, provided using the Ethernet interface 318.

A vehicle network manager (VNM) 326, as an example of the vehicle network manager 124 of FIG. 1, may be configured to monitor connectivity signals 327 received from the TCU 304 via the Ethernet vehicle network 316. Based on the connectivity signals 327, the vehicle network manager 326 may be configured to determine whether one or both of the available networks 308, 312 provide sufficient network connectivity for desired network-dependent operations of the IVI 302, e.g., of the infotainment applications 322, to continue.

If not, then the vehicle network manager 326 may proceed to deactivate the VVLAN of the Ethernet interface 318. Such deactivation is immediately communicated to the Ethernet manager 324 as a network state update 325, and experienced by the infotainment framework 322 as a loss of network connection, thereby notifying the infotainment applications 322 of the lost network connection.

The infotainment framework 320 is further illustrated as including software modules labeled as a mobile network manager 328 and a WiFi network manager 330. The mobile network manager 328 may be configured to be responsible for all cellular network related requests, responses, and notification handling. For example, the mobile network manager 328 may be configured to manage 3G/4G/5G mobile network connections, including, for example, setting up multiple mobile data connections at the same time for different purposes (e.g., providing high speed Internet access as well as accessing a carrier's multimedia (MMS) center).

Somewhat similarly, the WiFi network manager 330 may be configured to provide multiple types and aspects of WiFi access. For example, the WiFi network manager 330 may be configured to support both WiFi station mode (STA) and hotspot mode (AP). In other words, for example, the vehicle 102 may be enabled to connect to other WiFi network(s) as a station, and can also be a WiFi access point to connect to other devices (e.g., for Apple Car Play or Android Auto applications).

The infotainment framework 320 further includes a connectivity manager 332 that is configured to manage all communications related to network access between the infotainment applications 322 and the infotainment framework 320. For example, as illustrated, the connectivity manager 332 may be configured to manage all network-relevant communications between the infotainment applications 322 and any and all of the mobile network manager 328, the WiFi network manager 330, and the Ethernet manager 324.

For example, when the vehicle network manager 326 deactivates the VVLAN, the Ethernet manager 324 may receive the network state update 325, as referenced above. Similarly, but conversely, when the vehicle network manager 326 activates the VVLAN in response to determining that sufficient network connectivity is available (as determined from connectivity signals 327), the vehicle network manager 326 may reactivate the VVLAN, and configure the VVLAN to be connected to the Ethernet manager 324 to reestablish communication between the infotainment framework 320 and the TCU 304.

In some implementations, as referenced above with respect to the vehicle network manager 124 of FIG. 1, the vehicle network manager 326 of FIG. 3 may be configured to provide an additional Internet state update 338 to the Ethernet manager 324 when the VVLAN is restored. The Ethernet manager 324 may proceed to forward the Internet state update 338 to the connectivity manager 332 as Internet state update 334, and the connectivity manager 332 may be configured to forward the Internet state update 334 to the infotainment applications 322 as Internet state update 336. The additional Internet state updates 338, 334, 336 may include, for example, a quantified signal strength of the available network connection(s), a type of available network connection(s) (e.g., cellular and/or WiFi), and a reachability of the Internet using the available network connection(s).

Figure 4:
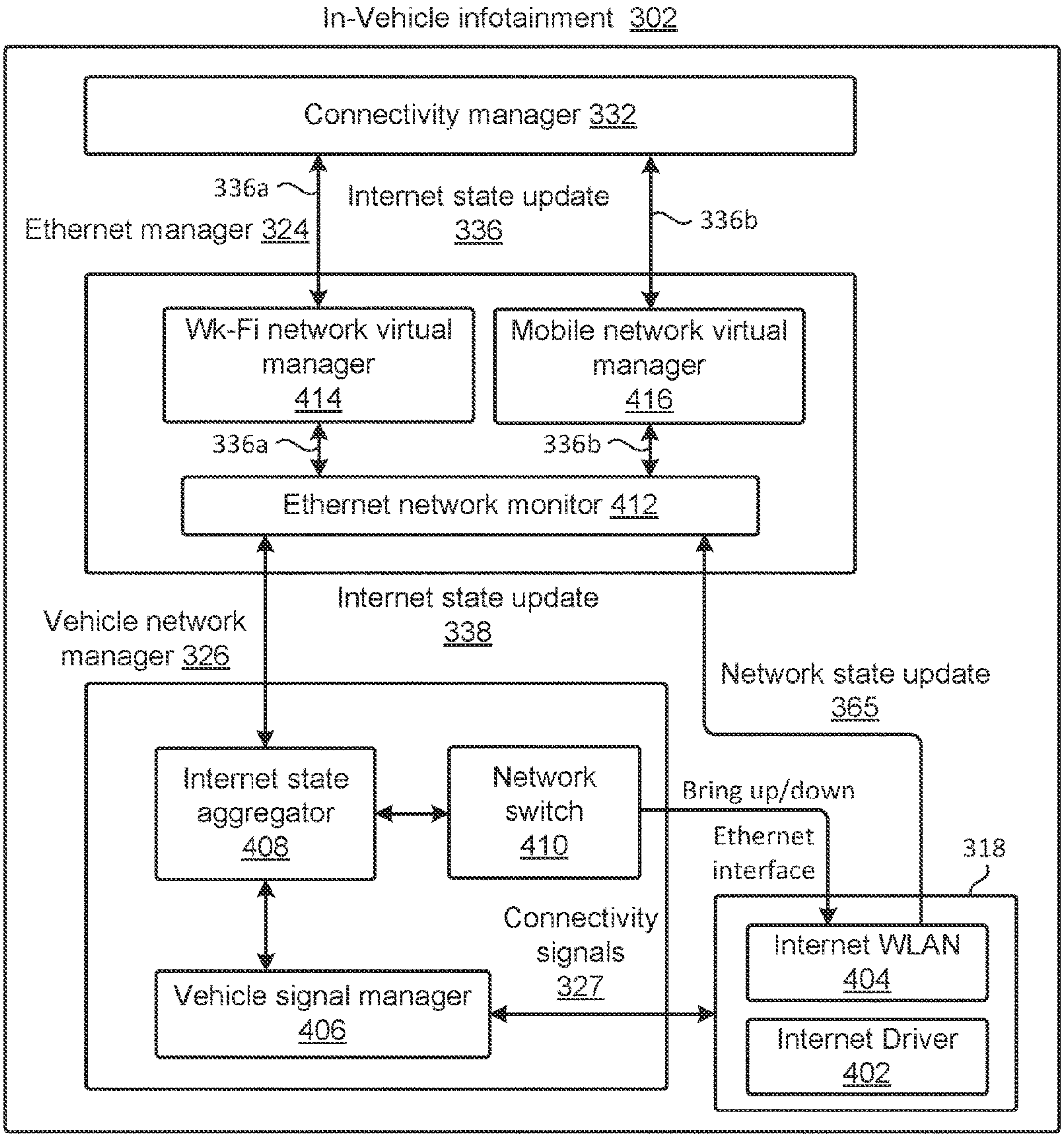
FIG. 4 is a block diagram illustrating a more detailed example of the example implementation of FIG. 3.

FIG. 4 is a block diagram illustrating a more detailed example of aspects of the IVI 302 of FIG. 3. In FIG. 4, the Ethernet interface 318 is illustrated in further detail as including an Ethernet driver 402, as well as including or providing a VVLAN 404, referenced in FIG. 4 as Internet VVLAN 404. That is, in FIG. 4, the Internet VVLAN 404 may be understood to provide a gateway function with respect to Internet access, using network connectivity provided by the TCU 304 of FIG. 3.

In more detail, for example, the Ethernet driver 402 may represent a physical interface having an address, such as eth0, while the Internet VVLAN 404 represents a virtual network using the Ethernet driver 402 and provided with a dependent address, such as eth0.100, to provide a stack interface. In example implementations, multiple VLANs may be implemented using corresponding different addresses, e.g., eth0.xxx.

In FIG. 4, the vehicle network manager 326 is illustrated as including a vehicle signal manager 406, which may be configured to parse the connectivity signals 327 to determine network-relevant signals. These network relevant signals may then be forwarded to an Internet state aggregator 408, which may be configured to aggregate the types of state information referenced above, e.g., type and signal strength of networks available, as well as an Internet reachability using the available network.

The Internet state aggregator 408 also may be configured to communicate with a network switch 410 to request the network switch 410 to activate or deactivate the Internet VVLAN 404. For example, the Network switch 410 may deactivate the VVLAN by tearing down the virtual interface eth0.100, while taking no action with respect to the underlying physical Ethernet network interface at physical port eth0, or with respect to any other VLAN supported by the physical port eth0.

To activate the Internet VVLAN 404, the switch may be configured to instruct the Ethernet interface 318 and the Ethernet driver 402 to configure a default IP routing table using eth0.100 as a default interface, add the eth0.100 MAC address to the static ARP table, set up a domain name system (DNS) server and related gateway, and otherwise configure the VVLAN to enable and maintain communications between the IVI 302 and the TCU 304.

FIG. 4 further illustrates that the Ethernet manager 324 may include an Ethernet network monitor 412, representing an example of the network monitor 126 of FIG. 1. As shown, the Ethernet network monitor may be configured to receive the network state update 325 from the Ethernet interface 318 and the Internet state update 338 from the vehicle network manager 326 (Internet state aggregator 408).

The Ethernet manager 324 may further include a WiFi network virtual manager 414 and a mobile network virtual manager 416, representing examples of the network virtual manager 128 of FIG. 1. As shown, the WiFi network virtual manager 414 may be used by the Ethernet network monitor 412 to forward WiFi-specific Internet state updates 336*a* to the connectivity manager 332 (and thereby to the infotainment applications 322), while the mobile network virtual manager 416 may be used by the Ethernet network monitor 412 to forward mobile-specific Internet state updates 336*b* to the connectivity manager 332 (and thereby to the infotainment applications 322).

For example, the network virtual managers 414, 416 may represent light-weight layers providing minimal relevant portions of corresponding full physical or virtual modems that might be configured within, or in communication with, the infotainment framework 320. Nonetheless, the network virtual managers 414, 416 provide the Ethernet manager 324 with an ability to provide WiFi and mobile (respectively) Internet state updates to the connectivity manager 332, so that the connectivity manager 332 and/or the infotainment applications 322 may take appropriate actions in response thereto.

For example, the infotainment applications 322 may represent many different applications, including third party applications, which may have different standards and requirements with respect to network access. Moreover, a user of the IVI 302 may be provided with various options for configuring the infotainment applications 322.

For example, some applications may be restricted to using only WiFi access, or only cellular access. Other applications may have pre-established criteria as to when WiFi or cellular access may or may not be used. For example, some applications may limit uploads/downloads of files larger than a certain size when only cellular networks are available, to avoid incurring excessive fees for use of the cellular networks. Therefore, the connectivity manager 332 may use a publish/subscribe architecture in which various ones of the infotainment applications 322 may subscribe to certain types or aspects of information that may be provided in the Internet state updates 336 (e.g., 336*a*, 336*b*).

Figure 5:
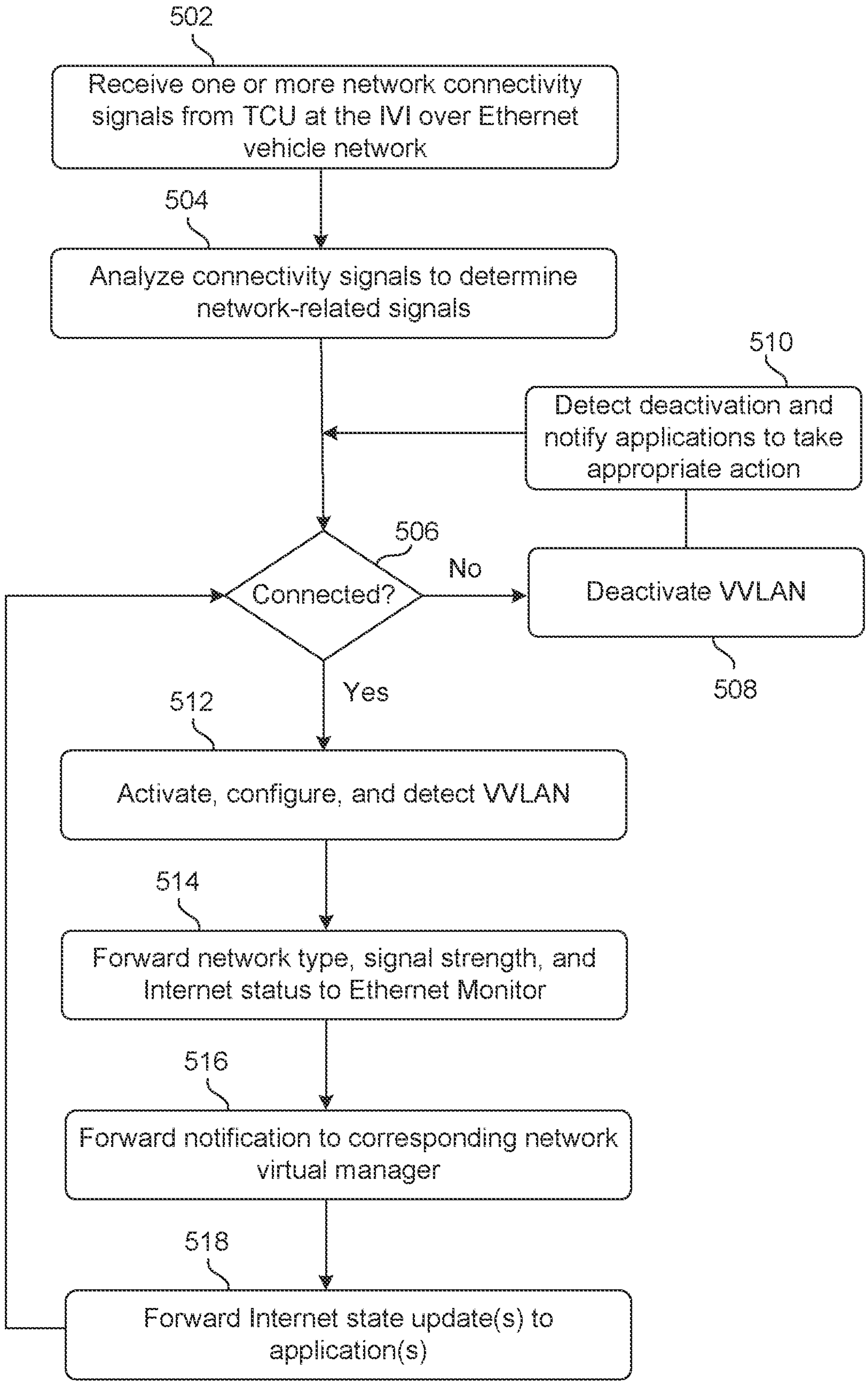
FIG. 5 is a flowchart illustrating example operations of the system of FIGS. 3 and 4.

FIG. 5 is a flowchart illustrating example operations of the system of FIGS. 3 and 4. In FIG. 5, it is assumed that the VVLAN it initially activated in conjunction with, e.g., a start of the vehicle 102. Then, one or more network connectivity signals 327 are received from the TCU 304 at the IVI 302, via the Ethernet vehicle network 316 and the Ethernet VVLAN 404 (502).

Then, the vehicle network manager 324 may analyze the connectivity signals 327 (504), e.g., using the vehicle signal manager 406. If it is determined by the Internet state aggregator 408 that no network is connected (506), then the VVLAN 404 may be deactivated (508), e.g., using the network switch 410.

Deactivation may be detected by the Ethernet network monitor 412 so that the infotainment applications 322 may be notified by the connectivity manager 332 (510). Deactivation may be maintained until at least one external network is determined to be connected (506), or until the vehicle is turned off.

Once external network connection is determined (506), the VVLAN may be activated and configured, e.g., using the network switch 410 as described above, and may be detected by the Ethernet network monitor 412 (512). In conjunction therewith, the internet state aggregator 408 may forward a determined network type, signal strength, and Internet reachability status as Internet state update 338 to the Ethernet monitor 412.

For example, in the context of a WiFi network use case, it may occur that the vehicle 102 is connected to an existing WiFi AP referred to as "ABC." This connection may be detected by the TCU 304 using the techniques described herein.

However, if the WiFi AP "ABC" is not connected to the Internet, then the vehicle network state would reflect connection to the network but not to the Internet. Once the WiFi network is connected to the Internet, the Internet state update 338 may be updated accordingly. Similar circumstances may occur with respect to a cellular/mobile network, such as when data stall on a 4G/5G network prevents Internet reachability even when the cellular/mobile network is connected. Thus, in these and similar context of FIGS. 3-5, network connectivity may be understood to represent a precondition for Internet reachability.

The resulting notification of Internet state update(s) 336*a*, 336*b* may be forwarded from the Ethernet network monitor 412 to the connectivity manager 332, via the appropriate network virtual manager(s) 414, 416 (516). Finally in FIG. 5, the Internet state update(s) 336 may be provided to any subscribed infotainment applications 322 (518).

The process of FIG. 5 may continue as long as the vehicle 102 is in operation (e.g., started). Accordingly, the Ethernet VVLAN may be used to quickly and efficiently notify infotainment applications 322 of current network connectivity information, so that the infotainment applications 322 may take appropriate action with minimal disruption to user experiences.

Figure 6:
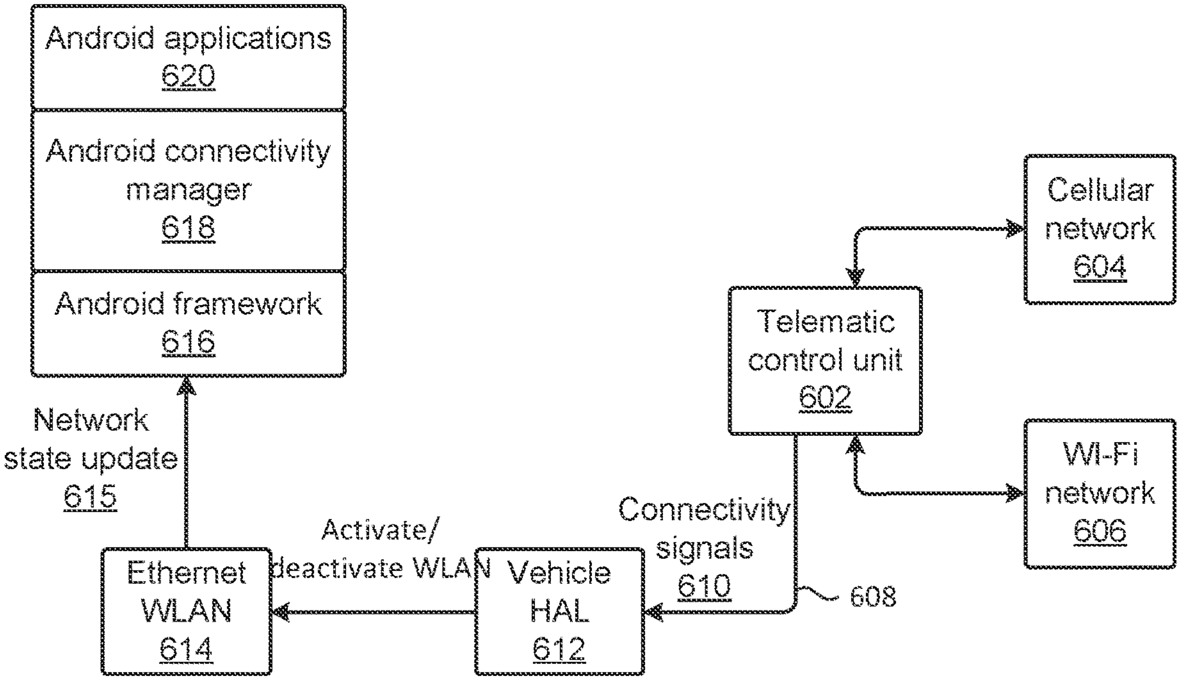
FIG. 6 is a block diagram illustrating an additional example of the system of FIG. 1.

FIG. 6 is a block diagram illustrating an additional example of the system of FIG. 1. In the example of FIG. 6, similar to the above examples, a TCU 602 receives network data from one or both of cellular network 604 and WiFi network 606. A physical network 608 provides connectivity signals 610, which may also include or be transmitted with network data, to a vehicle hardware abstraction layer (HAL) 612.

For example, in similar examples to FIGS. 3-5, the vehicle HAL 612 may represent a service running on a vehicle subsystem, such as the IVI 302 of FIG. 3. In the example of FIG. 6, the vehicle HAL 612 may provide the same or similar functionality as the vehicle network manager 124 of FIG. 1, or the vehicle network manager 324 of FIG. 3.

For example, the vehicle HAL 612 may be configured to activate or deactivate an Ethernet VVLAN 614 that is connected to an Android framework 616. In this way, and as described above, the Android framework 616 may be provided with a network status update 615.

Accordingly, an Android connection manager 618, similar to the connectivity manager 332 of FIGS. 3-5, may communicate with specific Android applications 620 to communicate a result of the network state update 615. As with the above-described examples, the Android applications 620 may then take appropriate action(s) with respect to their individual functions and network access policies/configurations.

In this way, implementation of the vehicle HAL 612 may be simplified, as compared, for example, to alternative implementations in which the vehicle HAL 612 is configured to interact with each of two or more hardware or virtual modems to communicate network connectivity information. That is, construction and use of such separate modems, including implementing communications between such separate modems and the vehicle HAL 612, may be resource-intensive, and may require nontrivial changes to the Android framework 616 itself.

In contrast, the techniques of FIG. 6 utilize deactivation/activation of the Ethernet VVLAN 614 to provide the network state update 615. Such an approach simplifies implementation of the vehicle HAL 612, while requiring few if any modifications to the Android framework 616 (or similar framework).

For example, although FIG. 6 is illustrated and described with respect to the Android context, it will be appreciated that any existing IVI or IVI-related framework may benefit from the described techniques. For example, existing Windows or Apple frameworks may similarly benefit.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive, at a vehicle subsystem of a vehicle, a connectivity signal over a vehicle network indicating a connectivity status of the vehicle to at least one external network;

determine, from the connectivity signal, whether the connectivity status is insufficient or sufficient for a network-dependent operation of the vehicle subsystem using the at least one external network;

deactivate a vehicle virtual local area network (VVLAN) provided to the vehicle subsystem using the vehicle network when the connectivity signal indicates that the connectivity status is insufficient for the network-dependent operation of the vehicle subsystem;

provide, to a vehicle network interface of the vehicle subsystem, a first network state update indicating the connectivity status is insufficient in response to deactivating the VVLAN;

reactivate the VVLAN when the connectivity signal indicates that the connectivity status is sufficient for the network-dependent operation of the vehicle subsystem; and provide, to the vehicle network interface, a second network state update indicating the connectivity status is sufficient in response to reactivating the VVLAN.

2. The computer program product of claim 1, wherein the instructions are further configured to cause the at least one computing device to:

receive the connectivity signal from a telematics control unit (TCU) of the vehicle.

3. The computer program product of claim 1, wherein the instructions are further configured to cause the at least one computing device to:

receive the connectivity signal at an operating system (OS) of the vehicle subsystem.

4. The computer program product of claim 1, wherein the at least one external network includes at least two external networks, and the connectivity signal provides the connectivity status with respect to each of the at least two external networks.

5. The computer program product of claim 4, wherein the at least two external networks include a WiFi network and a cellular network.

6. The computer program product of claim 1, wherein the connectivity signal indicates, for the at least one external network, whether the vehicle is connected or disconnected to the at least one external network.

7. The computer program product of claim 6, wherein, when the connectivity signal indicates that the vehicle is connected to the at least one external network, the connectivity signal also indicates a current signal strength of the at least one external network, a network type of the at least one external network, and an internet reachability status using the at least one external network.

8. The computer program product of claim 1, wherein the vehicle subsystem includes a vehicle subsystem operating system (OS) that provides the vehicle network interface, a framework executed using the vehicle subsystem OS, and an application executing using the framework to provide the network-dependent operation, and further wherein the instructions are configured to cause the at least one computing device to:

receive the connectivity signal at the vehicle subsystem OS; and activate or deactivate the VVLAN in response to the connectivity signal using the vehicle network interface.

9. The computer program product of claim 8, wherein the instructions are further configured to cause the at least one computing device to:

monitor whether the VVLAN is activated or deactivated at the framework; and when the VVLAN is determined to be activated, provide a notification from the framework to the application that the connectivity status is sufficient for the application to provide the network-dependent operation.

10. The computer program product of claim 9, wherein the instructions are further configured to cause the at least one computing device to:

provide, with the notification, a current signal strength of the at least one external network, a network type of the at least one external network, and an internet reachability status using the at least one external network.

11. A computer-implemented method, the method comprising:

receiving, at a vehicle subsystem of a vehicle, a connectivity signal over a vehicle network indicating a connectivity status of the vehicle to at least one external network;

determining, from the connectivity signal, whether the connectivity status is insufficient or sufficient for a network-dependent operation of the vehicle subsystem using the at least one external network;

deactivating a vehicle virtual local area network (VVLAN) provided to the vehicle subsystem using the vehicle network when the connectivity signal indicates that the connectivity status is insufficient for the network-dependent operation of the vehicle subsystem;

providing, to a vehicle network interface of the vehicle subsystem, a first network state update indicating the connectivity status is insufficient in response to deactivating the VVLAN;

reactivating the VVLAN when the connectivity signal indicates that the connectivity status is sufficient for the network-dependent operation of the vehicle subsystem; and providing, to the vehicle network interface, a second network state update indicating the connectivity status is sufficient in response to reactivating the VVLAN.

12. The method of claim 11, further comprising:

receiving the connectivity signal from a telematics control unit (TCU) of the vehicle.

13. The method of claim 11, wherein the at least one external network includes at least two external networks, and the connectivity signal provides the connectivity status with respect to each of the at least two external networks.

14. The method of claim 11, wherein, when the connectivity signal indicates that the vehicle is connected to the at least one external network, the connectivity signal also indicates a current signal strength of the at least one external network, a network type of the at least one external network, and an internet reachability status using the at least one external network.

15. The method of claim 11, wherein the vehicle subsystem includes a vehicle subsystem operating system (OS) that provides the vehicle network interface, a framework executed using the vehicle subsystem OS, and an application executing using the framework to provide the network-dependent operation, and further wherein the method comprises:

receiving the connectivity signal at the vehicle subsystem OS; and activating or deactivating the VVLAN in response to the connectivity signal using the vehicle network interface.

16. The method of claim 15, further comprising:

monitoring whether the VVLAN is activated or deactivated at the framework; and when the VVLAN is determined to be activated, providing a notification from the framework to the application that the connectivity status is sufficient for the application to provide the network-dependent operation.

17. The method of claim 16, further comprising:

providing, with the notification, a current signal strength of the at least one external network, a network type of the at least one external network, and an internet reachability status using the at least one external network.

18. A vehicle comprising:

at least one memory including instructions; and at least one processor that is operably coupled to the at least one memory and that is arranged and configured to execute instructions that, when executed, cause the at least one processor to receive, at a vehicle subsystem of the vehicle, a connectivity signal over a vehicle network indicating a connectivity status of the vehicle to at least one external network;

determine, from the connectivity signal, whether the connectivity status is insufficient or sufficient for a network-dependent operation of the vehicle subsystem using the at least one external network;

deactivate a vehicle virtual local area network (VVLAN) provided to the vehicle subsystem using the vehicle network when the connectivity signal indicates that the connectivity status is insufficient for the network-dependent operation of the vehicle subsystem;

provide, to a vehicle network interface of the vehicle subsystem, a first network state update indicating the connectivity status is insufficient in response to deactivating the VVLAN;

reactivate the VVLAN when the connectivity signal indicates that the connectivity status is sufficient for the network-dependent operation of the vehicle subsystem; and provide, to the vehicle network interface, a second network state update indicating the connectivity status is sufficient in response to reactivating the VVLAN.

19. The vehicle of claim 18, wherein the vehicle subsystem includes a vehicle subsystem operating system (OS) that provides the vehicle network interface, a framework executed using the vehicle subsystem OS, and an application executing using the framework to provide the network-dependent operation, and further wherein the instructions, when executed, are further configured to cause the at least one processor to:

receive the connectivity signal at the vehicle subsystem OS; and activate or deactivate the VVLAN in response to the connectivity signal using the vehicle network interface.

20. The vehicle of claim 19, wherein the instructions, when executed, are further configured to cause the at least one processor to:

monitor whether the VVLAN is activated or deactivated at the framework, and when the VVLAN is determined to be activated, provide a notification from the framework to the application that the connectivity status is sufficient for the application to provide the network-dependent operation; and provide, with the notification, a current signal strength of the at least one external network, a network type of the at least one external network, and an internet reachability status using the at least one external network.

* * * * *